United States Patent
Nilsson et al.

(10) Patent No.: US 6,625,320 B1
(45) Date of Patent: Sep. 23, 2003

(54) TRANSCODING

(75) Inventors: Michael E Nilsson, Ipswich (GB); Mohammed Ghanbari, Colchester (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/485,597

(22) PCT Filed: Nov. 27, 1998

(86) PCT No.: PCT/GB98/03553
§ 371 (c)(1),
(2), (4) Date: Feb. 14, 2000

(87) PCT Pub. No.: WO99/29113
PCT Pub. Date: Jun. 10, 1999

(30) Foreign Application Priority Data

Nov. 27, 1997 (EP) ............................................. 97309575

(51) Int. Cl.[7] ................................................. G06K 9/36
(52) U.S. Cl. ........................ 382/238; 382/233; 382/236
(58) Field of Search ................................ 382/238, 236, 382/240, 298, 233; 375/240.01, 240.03; 709/247; 348/699, 700, 714, 715; 345/519, 555, 556; 713/160, 180, 200; 341/50

(56) References Cited

U.S. PATENT DOCUMENTS

| | | | | |
|---|---|---|---|---|
| 5,600,646 A | | 2/1997 | Polomski | 370/263 |
| 5,717,462 A | * | 2/1998 | Hayashi | 348/416 |
| 5,774,206 A | * | 6/1998 | Wasserman et al. | 395/200.77 |
| 5,940,130 A | * | 8/1999 | Nilsson et al. | 348/416 |

FOREIGN PATENT DOCUMENTS

| | | | | |
|---|---|---|---|---|
| EP | 0 637 893 A1 | 2/1995 | | H04N/7/26 |
| EP | 0 652 678 A2 | 5/1995 | | H04N/7/36 |
| EP | 0 661 885 A1 | 7/1995 | | H04N/7/26 |
| EP | 0 690 392 A1 | 1/1996 | | G06F/17/14 |
| EP | 0 696 873 A2 | 2/1996 | | H04N/7/26 |
| EP | 0 710 030 A1 | 5/1996 | | H04N/7/26 |
| EP | 0782343 A2 | * 7/1997 | | H04N/7/50 |
| EP | 0 823 822 A2 | 2/1998 | | H04N/7/30 |
| JP | 407046603 A | * 2/1995 | | H04N/7/32 |
| WO | WO 95/29561 | 11/1995 | | H04N/7/26 |
| WO | WO 97/19559 | 5/1997 | | H04N/7/26 |
| WO | WO 98/19460 | 5/1998 | | H04N/7/26 |

OTHER PUBLICATIONS

Youn et al 1998 International Conference on Consumer Electronics Jun. 1998 vol. 44, No. 3, pp 649–658, XP–002096503 Motion Estimation for High Performance Transcoding.

* cited by examiner

Primary Examiner—Anh Hong Do
(74) Attorney, Agent, or Firm—Nixon & Vanderhye P.C.

(57) ABSTRACT

Transcoding is achieved by decoding a received video signal which has been coded according to a first coding scheme employing motion compensation and carries coded data and motion compensation information, and encoding the decoded according to a second coding scheme also employing motion compensation. Estimated motion vectors are generated for a current frame of the video signal, using vectors which, in the received signal, accompanying at least one other frame of the video signal. These may be used directly or used to define a search area for motion estimation.

35 Claims, 4 Drawing Sheets

TRANSCODING

BACKGROUND OF THE INVENTION

1. Field of the Invention

This invention relates to a method and apparatus for transcoding video signals from a first format into a second format.

2. Related Art

Many techniques for compression of video signals are known. Broadcast quality television requires in excess of 100 Mbit/s when transmitted in digital form, which is expensive to transmit and requires links of high bandwidth. Known compression coding techniques may be used which take advantage of the high degree of spatial and/or temporal redundancy in the video signals being encoded. So, for example, in videoconferencing applications, compression down to a bit rate of a few hundred kilobits per second is possible whereas videotelephone quality pictures including sound can be compressed down to only 64 kilobits per second, equivalent to a single telephone channel.

One known compression technique is predictive coding which exploits the assumption that a picture element (pixel) within a frame is related to neighbouring pixels in the same frame (spatial prediction) or a different frame (temporal prediction) and that the value of a pixel may therefore be predicted at a receiver instead of full information about the pixel being transmitted. It is only necessary to transmit the prediction error arising from such an assumption. For instance the first pixel of a frame may be transmitted exactly with each subsequent pixel being transmitted as the difference between it and its predecessor.

To reduce further the amount of information needed to be transmitted, a technique known as motion compensation may be used in which a picture is divided into blocks of pixels and each block of a current frame is compared with a corresponding block of a reference frame, which may be a previous or a subsequent frame, and with shifted positions of that block, and the region of the reference frame which the block most closely resembles is identified. The vector difference in position between the identified region and the block in question is termed a motion vector and is used to shift the identified region of the reference frame into the position of the relevant block in the current frame. Motion vectors are generated for most or all the blocks of a current frame and are used to derive a predicted frame from the reference frame(s). The differences between the current and predicted frame are, on average, smaller than those between the current and reference frame and can be encoded using less data. A decoder which already has the reference frames stored can thus reproduce the current frame using the motion vectors and the difference values. A signal may be coded using any of the aforementioned coding techniques either separately or in combination.

There are circumstances when it is desirable to employ a transcoder which receives a signal encoded according to a first coding scheme and outputs an encoded data stream encoded according to a second scheme. If one has a decoder which operates according to the second coding scheme then such a transcoder would allow the decoding of a signal encoded according to the first coding scheme without modifying the original encoder or the ultimate decoder Known transcoders generally decode a signal encoded according to a first coding scheme into an uncompressed signal which is then encoded by an encoder according to the second coding scheme to output a new data stream. Thus a full decoding operation is carried out to reconstitute the original video signal and then this video signal is encoded to provide a new coded data stream according to the second coding scheme. For coding methods involving motion compensation new motion vectors are generated for the signal encoded according to the second coding scheme and this accounts for a large proportion of the processing time of conventional transcoders. Transcoders are generally assumed not to exist in a transmission path i.e. a video signal encoded according to the H.261 standard is assumed to be received by a decoder conforming to the H.261 standard: the introduction of a transcoder into the transmission path will introduce delay into the path which delay may be unacceptable.

International patent application WO95/29561 describes a transcoder which receives a signal encoded according to a first coding scheme employing motion compensation and outputs a signal encoded according to a second coding scheme which also employs motion compensation, the motion vectors being extracted from the received video signal and transferred to the output signal. Thus, it is not necessary to recalculate the motion vectors for the second coding scheme. However this scheme presupposes that the received signal contains motion vectors suitable for use in the second coding scheme.

SUMMARY OF THE INVENTION

According to the present invention there is provided a transcoder comprising a decoder for decoding a received video signal coded according to a first coding scheme, and an encoder for reencoding the signal according to a second coding scheme, said coding schemes being such that at least some frames are coded using motion-compensated interframe predictive coding based on a reference frame which is not the same in the second coding scheme as it is in the first coding scheme, wherein that the transcoder includes motion vector processing means to generate an estimated motion vector for a current frame of the video signal, the motion vector processing means being connected to receive, when processing vectors for a current frame, vectors which, in the received signal, accompany at least one other frame of the video signal.

In another aspect, the invention provides a transcoder comprising a decoder for decoding a received video signal, said received signal being coded according to a first coding scheme employing motion compensation and comprising coded data and motion compensation information, and an encoder for encoding the output of the decoder according to a second coding scheme employing motion compensation, the encoder including motion estimation means for generating motion compensation information, wherein the motion estimation means is arranged to receive motion compensation information obtained from the received signal and to carry out motion estimation within a search area centred on the received motion compensation information, wherein, for use where at least some frames are coded using motion-compensated inter-frame predictive coding based on a reference frame which is not the same in the second coding scheme as it is in the first coding scheme, the transcoder includes motion vector processing means to generate an estimated motion vector for a current frame of the video signal, the motion vector processing means being connected to receive, when processing vectors for a current frame, vectors which, in the received signal, accompany at least one other frame of the video signal, and the motion estimation means being connected to receive the said estimate.

In a further aspect, the invention provides a method of transcoding a received video signal coded according to a first coding scheme into a signal according to a second coding scheme, said coding schemes being such that at least some frames are coded using motion-compensated inter-frame predictive coding based on a reference frame which is not the same in the second coding scheme as it is in the first coding scheme, characterised by processing received motion vectors to generate an estimated motion vector for a current frame of the video signal, the processing step being responsive, when processing vectors for a current frame, vectors which, in the received signal, accompany at least one other frame of the video signal.

In yet another aspect of the invention there is provided a method of transcoding a signal representing a two-dimensional array, the method comprising decoding a received signal encoded according to a first coding scheme employing motion compensation, said signal comprising coded data and motion compensation information, and encoding the decoded output according to a second coding scheme employing motion compensation, the encoding including generating motion compensation information by carrying out motion estimation within a search area centred on motion compensation information obtained from the received signal, wherein, for use where at least some frames are coded using motion-compensated inter-frame predictive coding based on a reference frame which is not the same in the second coding scheme as it is in the first coding scheme, the method includes the step of motion vector processing to generate an estimated motion vector for a current frame of the video signal, the processing step being responsive, when processing vectors for a current frame, vectors which, in the received signal, accompany at least one other frame of the video signal, and the motion estimation serving to perform estimation within a search area centred on a position determined by the said estimate.

BRIEF DESCRIPTION OF THE DRAWINGS

Other, preferred, aspects of the invention are set out in the sub-claims.

The invention will now be described further by way of example with reference to the accompanying drawings, in which.

DETAILED DESCRIPTION OF THE EXEMPLARY EMBODIMENTS

Figure 1:
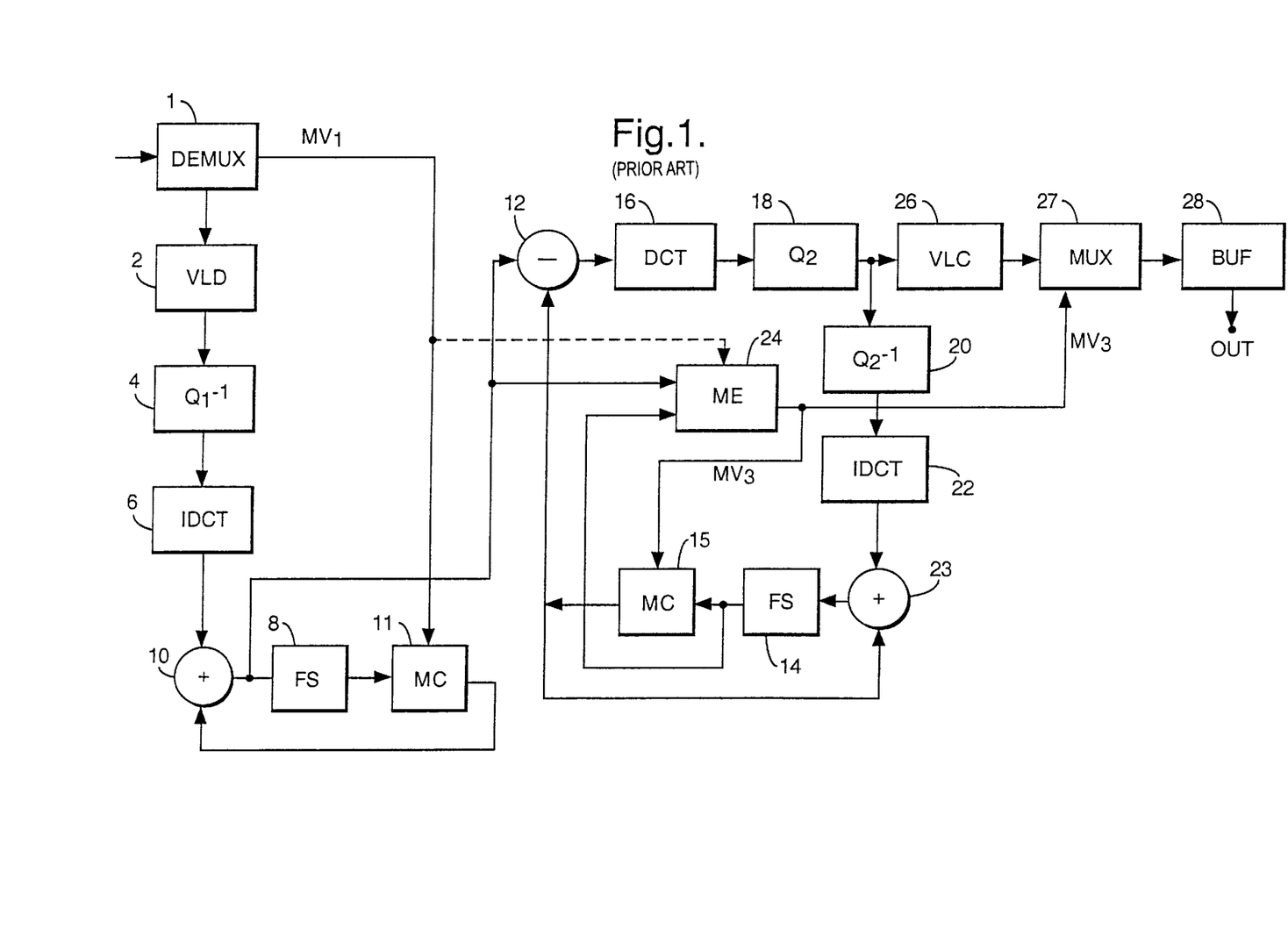
FIG. 1 shows a known transcoder.

A transcoder is used to convert signals encoded according to a first format into signals encoded according to a second format. FIG. 1 shows a known form of transcoder which is arranged to convert video signals coded at a particular bit rate (e.g. 64 k bit/s) conforming to the H.261 standard to video signals coded at a lower rate (e.g. 32 k bit/s) conforming to the H.261 standard. Clearly the transcoder may, in practice, be arranged to convert signals from and to other formats.

The decoder part of the transcoder shown in FIG. 1 comprises a de-multiplexer 1 which receives an incoming coded data stream conforming to the H.261 standard and de-multiplexes the data stream into its constituent parts of compressed video data and motion vectors. The compressed video data is then decoded by a variable length decoder (VLD) 2, and then passes to an inverse quantiser 4 which outputs values of the discrete cosine transform (DCT) coefficients. The DCT coefficients are then transformed back into the pixel domain by an inverse discrete cosine transform (IDCT) unit 6 to produce a video signal in the pixel domain. This signal is then added by an adder 10 to the previous frame (if any) stored in a frame store 8 and the resulting predicted frame is stored in the frame store 8. Upon receipt of the first frame, the uncompressed frame is stored in a frame store 8—i.e. the second input to the adder 10 is zero. For subsequent frames, the decoded data represent a prediction error and are added to the contents of the frame store 8 by the adder 10. However, the frame store output is motion-compensated by a motion compensator 11 controlled by motion vectors from the demultiplexer 1.

The frame output by the decoder part is then output to a subtractor 12 of the encoder part, which also receives as an input the output of a frame store 14 of the encoder part, which stores a decoded version of the previous encoded frame of the encoding loop. Before the contents of the frame store 14 are input to the subtractor 12, motion compensation is carried out by a motion compensation unit 15 on the contents of the frame store 14, under control of a motion estimator 24 which, for each block of a frame to be encoded, searches the frame store 14 in the vicinity of the block position to identify a region which best resembles the block: the vector offset between the block position and the region identified forms a motion vector for controlling the motion compensation unit 15.

The output of the subtractor 12 is converted to discrete cosine transform coefficients by a discrete cosine transform (DCT) unit 16, quantised by a quantiser 18 and variable-length coded by a coder 26 for transmission. The motion vectors calculated by the motion estimator 24 are multiplexed into the data stream by a multiplexer 27. A buffer 28 buffers the encoded data stream output by the multiplexer 27, to provide an output at the bit rate required by the transmission medium. This output may have a constant bit rate or a variable one. To generate the contents of the frame store 14, the output of the quantiser 18 is decoded by an inverse quantiser 20 and inverse DCT unit 22 and added to the motion-compensated contents of the frame store 14 by an adder 23.

One aspect of the transcoder which involves a significant amount of processing power is the operation of the motion estimator 24; thus motion vector estimation for an 8×8 block is typically carried out within a search area of ±8 or ±16 pixels in both directions around the block, involving, even for the ±8 case, some 289 calculations. Consequently, efforts have been made to simplify this by making use in some way of the motion vectors already present in the incoming signal. Thus, our international patent application WO 95/29561 describes a transcoder like that of FIG. 1 but proposes to eliminate the motion estimation unit 24 by feeding the incoming motion vectors to the motion compensation unit 15 and the multiplexer 27, either directly or—in the case where the pixel resolution of the incoming and outgoing video signals differ—after scaling by an appropriate factor.

Another approach has been suggested in U.S. Pat. No. 5,600,646. There it is suggested that the incoming motion vector be used as a "seed" for the search; by starting the search at the displacement given by the corresponding vector from the decoder, a much smaller search area is found to be sufficient. In the U.S. patent, a search extent of ±3 pixels is suggested, though we have found that a search area of ′1 pixel gives useful results.

The manner of inter-frame differential coding employed in the H.261 standard is straightforward in that each predictive coding process is based on the previous frame as a reference. However not all known coding systems do so—the MPEG standard, described further below, is one example. The present invention aims to make use of the incoming motion vectors in a situation where the transcoder operates between two coding standards where at least some frames are coded using motion-compensated inter-frame predictive coding based on a reference frame which is not the same in the one standard as it is in the other standard. The transcoder now to be described is designed for use in one such situation, viz. the conversion of an MPEG-coded signal to an H.261-coded signal.

Firstly, the format of an MPEG signal will be explained. It should be noted that when in this description we use expressions such as "earlier", "later", "preceding" or "next", this refers (unless explicitly stated otherwise) to the order of the frames in capture and display order (i.e. as would be output by a camera, or seen on a display monitor), irrespective of the actual order in which the frames are coded or transmitted. In MPEG, frames are coded in three distinct ways, resulting in three different types of coded frame. An intra-frame, or I-frame, is not coded by reference to any other frame (i.e. it does not employ inter-frame differential coding at all). A predicted frame (P-frame) is coded by motion-compensated inter-frame differential coding relative to an earlier frame. This earlier frame must be either an I-frame or a P-frame and is, in general, not the immediately preceding frame. The third type of frame is a bidirectional frame (B-frame). One or more B-frames may occur between an I-frame or P-frame and the next I-frame or P-frame; the actual number is not restricted by the standard but in practice there are always two. For the purposes of description, we will refer to a sequence of frames beginning and ending with an I-frame, but containing no intermediate I-frames, as a group of pictures; and to a sequence beginning and ending with an I-frame or P-frame as a subgroup of pictures (this terminology is not necessarily the same as that used in the published standard). Note that using the terminology (except at the beginning and end of a transmission) an I-frame belongs to two groups of pictures and an I-or P-frame belongs to two subgroups of pictures. It follows that a group of pictures contains one or more sub-groups of pictures. In practice there are four types of sub-group: IBBI, IBBP, PBBI and PBBP.

Each block within a B-frame is coded in one of four ways:

(a) by motion-compensated inter-frame differential coding based on the the most recent past frame which is not itself a B-frame (a motion vector for forward prediction may be transmitted);

(b) by motion-compensated inter-frame differential coding based on the next future frame which is not itself a B-frame (a motion vector for backward prediction may be transmitted);

(c) by interpolation: a prediction of the block for the purpose of differential coding is formed by interpolation between the motion-compensated inter-frame prediction based on the most recent past frame which is not itself a B-frame and the motion-compensated inter-frame prediction based on the next future frame which is not itself a B-frame (a motion vector for forward prediction and a motion vector for backward prediction may be transmitted);

(d) without inter-frame predictive coding (an "intra-block").

The coder decides which of (a), (b) and (c) to use according to which gives the best prediction and hence the most economical coding. Intra-blocks (d) are used if the coder finds that none of the other options gives a useful prediction. These do not occur often in practice. Note also that this decision is made on a block-by-block basis, so that a given B-frame will more often than not involve the use of more than one of these four methods.

Because backward prediction is used for the B-frames, it is necessary to code (and decode) the frames within a subgroup in a different order from the capture and display order, though the order of the subgroups in unaffected. Thus, for an IBBP subgroup the I-frame is coded first, followed by the P-frame, and then the B-frames. As this is the order of decoding, the frames are transmitted in this order (this is not actually necessary, but minimises delay).

Figure 2A:
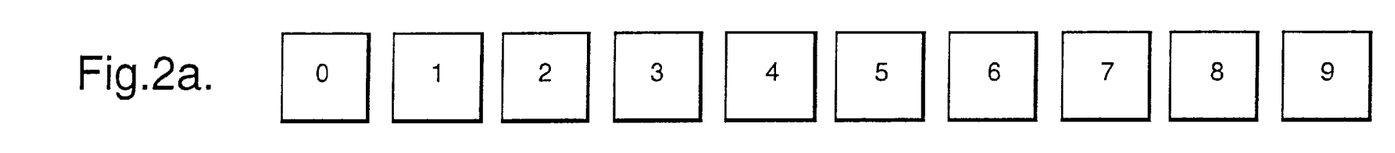
FIG. 2 shows the capture, coding and display order for video signals conforming to MPEG and H.261 coding standards.
Figure 2B:
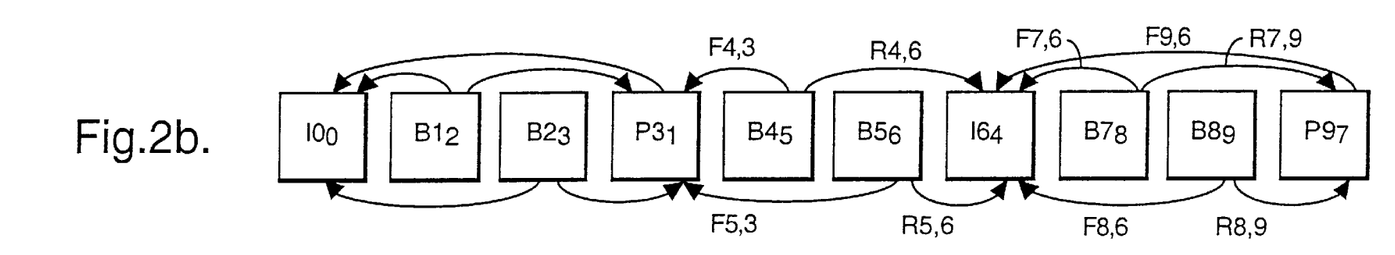

FIG. 2a shows ten frames of a video signal, in capture and display order, numbered 0 to 9. FIG. 2b shows these same frames referenced with a letter I, P or B to indicate the type of coding to be used, followed by the same number, and then by a subscript indicating the order in which the frames are processed by an MPEG coder or decoder. In this description the frames will be referred to as I0, B1 etc. and the subscripts added only where this assists understanding. This Figure also shows the motion vectors diagrammatically by means of arrows, where the arrowhead points to the reference frame. Forward motion vectors are notated as Fi,j where the first index indicates which frame the vector belongs to and the second index identifies the reference frame: thus F4,3 is the vector for frame B4, relative to frame P3 as reference frame. Backward vectors are indicated by R—e.g. R4,6 is the vector for frame B4, relative to frame I6 as reference frame.

Figure 3:
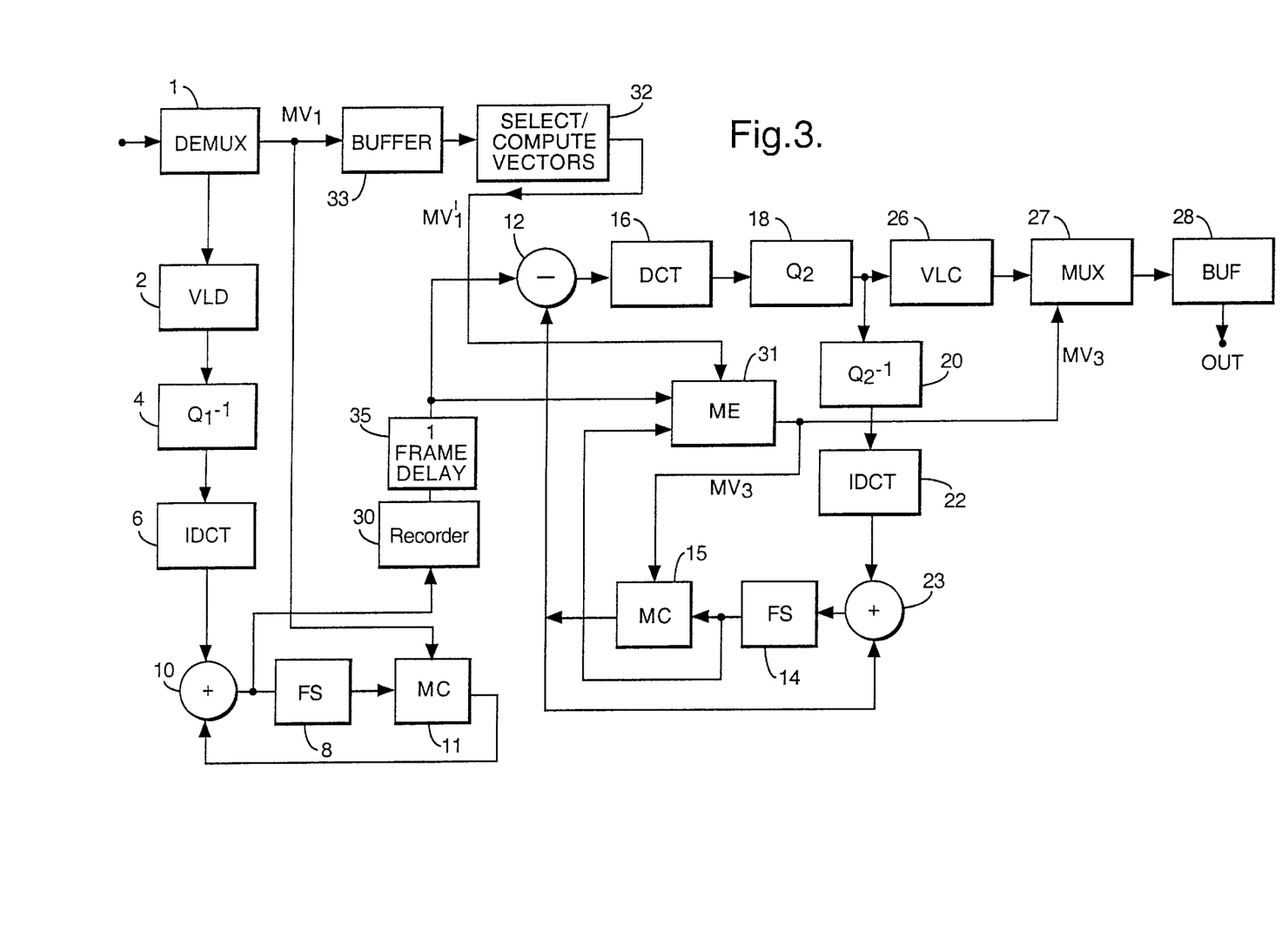
FIG. 3 shows a second embodiment of a transcoder according to the invention.

FIG. 3 shows a transcoder according to one embodiment of of the invention arranged to receive signals encoded according to ISO/IEC standard 11172-2 (commonly known as MPEG 1) and to output signals encoded according to H.261.

Figure 2C:
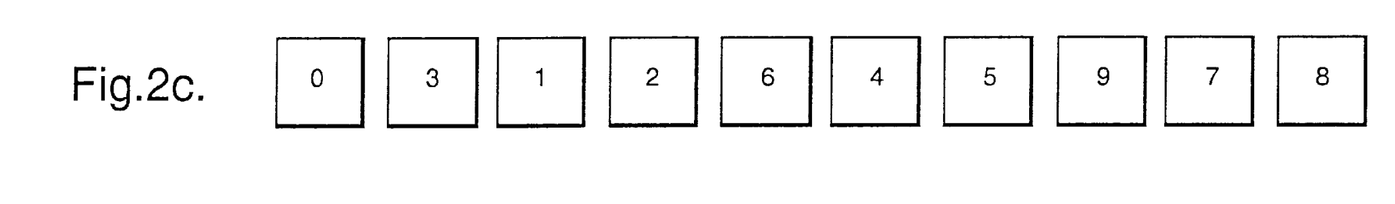

The transcoder has a similar structure to that of FIG. 1, and components having substantially the same function are indicated using the same reference numerals. The decoder part is formed by items 1 to 11, plus a frame reordering unit 30 which receives the decoded frames in the order of receipt—i.e. the order shown in FIG. 2c—and outputs them in display and capture order—i.e. as shown in FIG. 2a (it contains two frame stores and read-write circuitry to read and write the frames in the required order). This is a conventional MPEG decoder except that (for reasons which will be explained) the frames are delayed longer than would be usual: for this reason the reordering unit 30 is followed by a one-frame delay 35. The timing of the frames incoming to the transcoder ("IN") and output from the reordering unit ("OUT") is shown in the following Table:

| IN  | 0 |   | 3 |   | 1 |   | 2 |   | 6 |   | 4 |   | 5 |   | 9 |   | 7 |   | 8 |   | etc |   |
|-----|---|---|---|---|---|---|---|---|---|---|---|---|---|---|---|---|---|---|---|---|-----|---|
| OUT |   |   |   |   |   | 0 |   | 1 |   | 2 |   | 3 |   | 4 |   | 5 |   | 6 |   | 7 |   8 | 9 |

In other words the picture reordering unit 52 receives frames 0, 3, 1; outputs frame 0; stores the next decoded frame 2; outputs frame 1; stores the decoded frame 6; outputs frame 2; stores the decoded frame 4; and so on. Clearly if more P and B frames occur between each I frame, the picture reordering unit 52 will need to be arranged to store more frames of data.

On the encoder side, items 12 to 28 form an H.261 encoder just like the one in FIG. 1, except that the motion estimation unit 24 is replaced by a motion estimation unit 31.

Before proceeding with description of the remainder of FIG. 3, we observe that the encoder is required to produce an H.261 signal, that is, for the sequence depicted in FIG. 2$a$, a sequence as shown in FIG. 2$d$, where each frame after the first is a predicted frame based on the immediately preceding frame as reference, and requires the generation of a motion vector relative to that immediately preceding frame. Looking at the motion vectors provided by the MPEG signal, we see that:

$I0_0$ and $I6_4$ will contain no vectors as they are reference pictures.

$P9_7$ may only contain vectors relative to $I6_4$.

$B4_5$ and $B5_6$ may contain forward vectors from $P3_1$, and backward vectors from $I6_4$.

$B7_8$ and $B8_9$ may contain forward vectors from $I6_4$, and backward vectors from $P9_7$.

When such a MPEG signal is transcoded to H.261, the set of forward and backward vectors which may relate to non-consecutive pictures must be converted to a set of forward vectors that relate from one picture to the next. For this purpose, the embodiment as shown in FIG. 3 includes a motion vector processor 32 for deriving forward motion vectors $MV'_1$ from the forward and backward motion vectors $MV_1$.

The one-frame delay mentioned earlier serves to ensure that, at the time the encoder comes to process any particular frame, all the vectors which might be needed have in fact been received. The motion vector processor 32 is preceded by a buffer 33 which is sufficiently large to contain all the vectors for five consecutive frames of the incoming signal to ensure that, at the time the processor comes to estimate motion vectors for any particular frame, all the vectors which might be needed are still available.

The processor 32 is a program-controlled processing unit which serves to examine the contents of the buffer 33 and to extract from it, for each block of each frame, one or more vectors, and to perform, where necessary, arithmetic operations upon it or them so as to form at least one estimated motion vector for use in coding the frame under consideration according to the H.261 standard. There are four types of vector derivation that may be used. The first of these is the forward vector. Since the objective is to obtain a forward vector which identifies for a frame j a region of the immediately preceding frame j−1 suitable for prediction, the obvious candidate, if available, is the single step forward vector VFS from the MPEG frame. If, on the other hand, the MPEG frame carries a forward vector referencing a frame earlier by n frames (i.e. frame j−n), then this vector can be divided by n to give a vector usable for frame n or indeed for the intervening frame(s) j−1 . . . j−n+1. This is notated here generically as VFN or, for specific values of n as VF2, VF3 etc.

A second type of derivation takes note of the fact that if the MPEG signal contains a backward vector for a frame j−1 (or j−n) relative to frame j, then the negative of this (divided by n if need be) is a fair estimate VRS (or VRN) of the wanted vector.

Thirdly, one may take the difference between two forward vectors to obtain a forward difference vector VRD; and fourthly the negative of the difference between two backward vectors (VRD). A mixed vector VMX, for example, for frame $B7_8$=F9,6+R7,9, may also be useful but is not included in the present version.

Because none of the vectors shown in FIG. 2$b$ is actually guaranteed to occur in particular subgroup of pictures, one may also include the possibility of using the vector derived for a nearby frame (notated as VFS(j−1) etc.). This means that the probability of no derived vector being available becomes very small: however, should this occur land it will only occur if the block in question or the corresponding block in its (later) reference frame was coded as an intra-block) then that block can be coded as an intra-block in the outgoing H.261 signal. Most of these possibilities are set out in the Table below for blocks I6, B7, B8 and P9.

| Frame | VFS/VFN | VRS/VRN | VFD | VRD |
|---|---|---|---|---|
| $I6_4$ | 1) VFS(j + 1) = F7,6<br>4) VF2(j − 1) = ½F5,3<br>6) VFS(j − 2) = F4,3<br>9) VF3(j + 3) = ⅓F9,6 | 2) VRS(j − 1) = −R5,6<br>7) VR2(j − 2) = −½R4,6<br>8) VR2(j + 1) = −½R7,9 | 3) VFD(j − 1) = F5,3 − F4,3 | 5) VRD(j − 1) = −(R4,6 − R5,6) |
| $B7_8$ | 1) VFS = F7,6<br>3) VF2(j + 1) = ½F8,6<br>7) VF3(j + 2) = ⅓F9,6 | 2) VR2 = −½R7,9<br>4) VRS(j + 1) = −R8,9<br>9) VRS(j − 2) = −R5,6 | 5) VFD(j + 1) = F8,6 − F7,6<br>8) VFD(j + 2) = F9,6 − F8,6 | 6) VRD(j + 1) = −(R7,9 − R8,9) |
| $B8_9$ | 1) VF2 = ½F8,6<br>2) VFS(j − 1) = | 7) VR2(j − 1) = −½R7,9 | 4) VFD = F8,6 − F7,6 | 5) VRD = −(R7,9 − R8,9) |

-continued

| Frame | VFS/VFN | VRS/VRN | VFD | VRD |
|---|---|---|---|---|
| | F7,6<br>6) VF3(j + 1) =<br>⅓F9,6 | 3) VRS = −R8,9 | 8) VFD(j + 1) =<br>F9,6 − F8,6 | |
| P9₇ | 5) VF3 = ⅓F9,6<br>6) VF2(j − 1) =<br>½F8,6<br>7) VFS(j − 2) =<br>F7,6<br>8) VF3(j + 1) =<br>F10,9<br>11) VF3(j + 3) =<br>⅓F12,9 | 1) VRS(j − 1) = −R8,9<br>9) VR2(j − 2) =<br>−½R7,9<br>10) VR2(j + 1) =<br>−½R10,12 | 2) VFD = F9,6 −<br>F8,6<br>3) VFD(j − 1) =<br>F8,6 − F7,6 | 4) VRD(j − 1) =<br>−(R7,9 − R8,9) |

By way of explaining some of these more fully:

For B7₈, the single forward vector VFS is simply its forward vector F7,6 from I6₄. Its scaled backward vector is minus one half of its backward vector R7,9 from P9₇. There is no forward difference vector and no backward difference vector.

For B8₉, the scaled forward vector is half its forward vector F8,6 from I6₄. Its scaled backward vector is minus its backward vector from P9₇. The backward difference vector is the difference between its own backward vector and that of B7₈. Its forward difference is the difference between its own forward vector and B7₈'s forward vector.

For P9₇, the scaled forward vector is one third of its forward vector from I6₄. Its forward difference is the difference between P9₇'s forward vector and B8₉'s forward vector. There is no scaled backward vector and no backward difference vector.

For I6₄, there are no vectors: vectors for this frame must be derived from vectors for nearby frames.

There are three possible modes of operation for this motion vector derivation (it being assumed that any given version of the apparatus uses one of these only).:

(i) hierarchical;
(ii) evaluation;
(iii) a combination of the two.

In the hierarchical method, the processor 32 operates in accordance with a preferred order of the vector types. These depend on the frame type, and are shown by the numbering in the table, so for I6, the hierarchy might be: VFS(j+1), VRS(j−1), VFD(j−1), VF2(j−1), VRD(j−1), VFS(j−2), VR2(j−2), VR2(J+1) and VF3(j+3).

Thus for I6, the processor reads VFS(j+1) from the buffer if it is available. If not, it reads VRS(j−1). If this is not available then it reads out the two vectors necessary to calculate VFD(j−1), and subtracts them to form the derived vector. And so on.

In the evaluation method, the processor computes all the available candidate vectors for the current block and forwards them to the motion vector estimation unit 31 which then evaluates them by, for each vector, forming a predicted block using that vector (after a search as described below, if this option is being used) and calculating a metric (such as the sum of absolute differences) between the predicted block and the block to be encoded. The vector to be chosen is the one giving the lowest metric.

The combined method is the same as the evaluation method, except that the number of vectors to be evaluated is limited to the first few (perhaps three) available vectors, considered in the order prescribed by the list.

It is possible, though non-optimum, to use the vector obtained in this way directly: in fact, if one does so, using the hierarchical method the motion vector evaluation unit 31 becomes just a through-connection. We prefer, however, to use the vector to establish an offset for the motion vector estimation unit 31 to perform a search around a small area around the position established by the vector. Thus the the motion vector estimation unit 31 carries out motion estimation in a search area, the location of which is determined by the received motion vectors.

Figure 4:
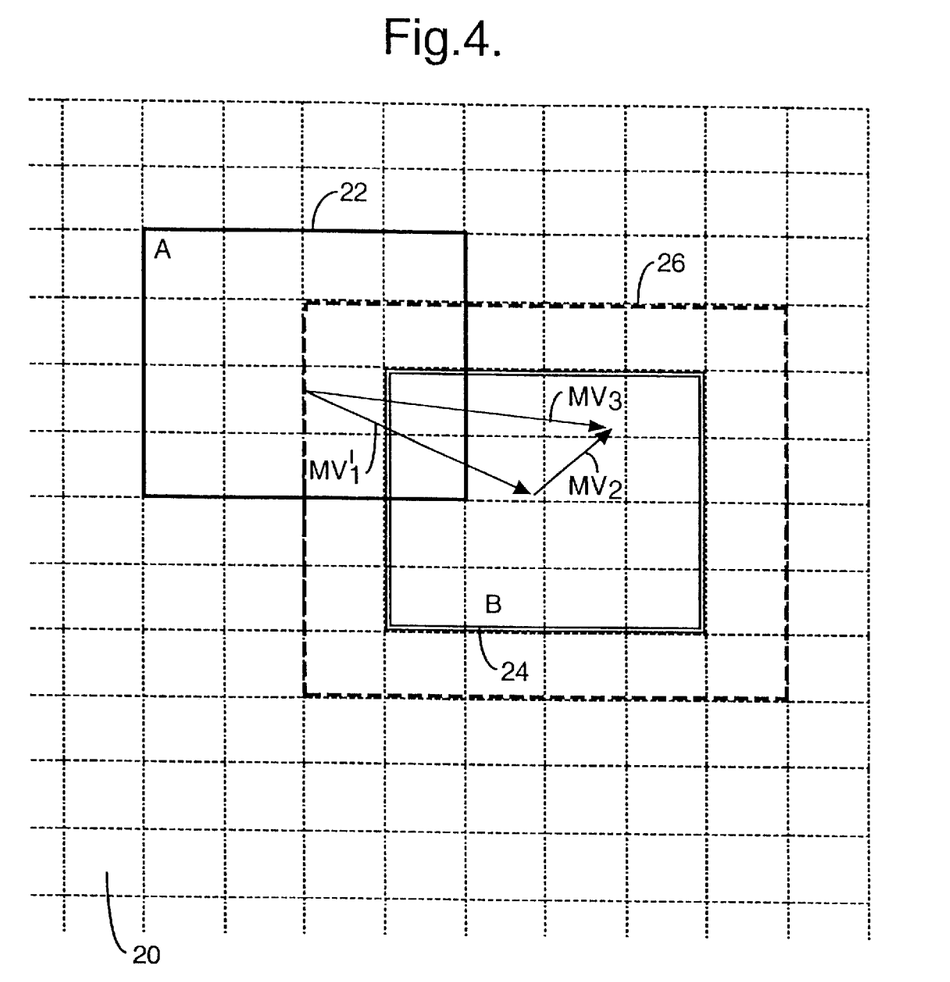
FIG. 4 shows a portion of a frame store and illustrates the motion vector generation.

This is illustrated in FIG. 4, which shows a portion of the frame store 14, each square 20 representing a picture element (or pixel). Conventionally, motion vectors are determined for blocks of pixels rather than for each individual pixel; FIG. 4 therefore shows a block 22 of 4×4 pixels. For a prior art transcoder, for instance as is described in WO95/29561, the motion vectors would simply result in the prediction for the block currently under consideration being the region within the frame store determined by the received motion vector $MV_1$ for the block, before the subtractor 12 carried out its operation.

In a transcoder according to this version of the invention however, further motion estimation is carried out. The motion vector $MV'_1$ from the processor 32 initiates a search in the frame store 14 around a position offset from the current block under consideration by an amount represented by the motion vector associated with the current block.

For instance, suppose that the motion vector $MV'_1$ received for a current block (shown is solid lines in FIG. 4) at the position A in a current picture specifies a shift from the position A to the position B shown in double lines. Further motion estimation is then carried out in a search area 26 around position B (indicated by dotted lines).

Conventionally, according to the H.261 or the MPEG standard, motion estimation is carried out for a search area of ±8 or ±16 pixels around the block. Although a full motion estimation search may be carried out, it has been found that a severely limited search in the region ±1 pixel (as shown by the search area 26) gives significantly improved results compared to the arrangement described in WO95/29561. Such a restricted search area means that the number of calculations required to determine a motion vector for the second coding scheme is reduced (for a 8×8 block and a search area of ±8 pixels) from 289 calculations to 9 calculations. The calculated motion vector $MV_2$ is then added to the motion vector $MV'_1$ to form a new motion vector $MV_3$ for the block. Once a new motion vector $MV_3$ is calculated the block of the frame store 14 centred on the new motion vector $MV_3$ is output to the subtractor 12 and the motion vectors $MV_3$ are input to the multiplexer 27.

Figure 2D:
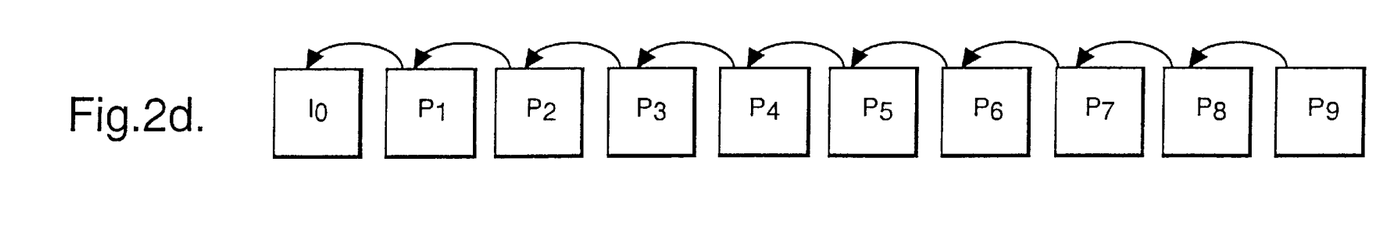

Although the transcoder described is designed to transcode MPEG signals into H.261 signals, the principle is applicable to other situations where at least some frames are coded using motion-compensated inter-frame predictive coding based on a reference frame which is not the same in the one standard as it is in the other standard. For example the transcoder of FIG. 3 could be configured for the reverse conversion. If the motion vectors for the H.261 frames shown in FIG. 2d are denoted by F1,0, F2,1, F3,2 etc., then estimates F'i,j of the motion vectors required to construct an MPEG signal can be constructed as follows:

F'7,6=F7,6
F'8,6=F8,7+F7,6
F'9,6=F9,8+F8,7+F7,6
R'7,9=−(F9,8+F8,7)
R'8,9=−F9,8.

In the event that one or more vectors is absent from the incoming signal, vector estimates for non-consecutive frame prediction might be generated by multiplying the incoming vectors, e.g.:

F'8,6=2*F8,7
F'8,6=2*F7,6
F'9,6=3*F9,8
F'9,6=3*F8,7
F'9,6=3*F7,6
R'7,9=−2*F9,8
R'7,9=−2*F8,7.

What is claimed is:

1. A transcoder comprising:
   a decoder for decoding a received video signal coded according to a first coding scheme employing motion-compensated inter-frame predictive coding in which frames are coded out of sequence such that the coding of some frames involves prediction from a later frame using backward motion vectors,
   an encoder for reencoding the signal according to a second coding scheme in which at least some frames are coded using motion-compensated inter-frame predictive coding based on a reference frame which is not the same in the second coding scheme as it is in the first coding scheme, and
   a motion vector processor generating an estimated motion vector for a current frame of the video signal, the motion vector processor being connected to receive, when processing vectors for a current frame, vectors which, in the received signal, accompany at least one other frame of the video signal, and being operable to reverse the sign of backward motion vectors when generating estimated motion vector for use by the encoder when re-encoding using forward prediction.

2. A transcoder as in claim 1 including a buffer buffering received motion vectors and a delay delaying the video signals prior to reencoding.

3. A transcoder as in claim 1 in which the motion vector processor produces an estimated motion vector which is the reverse of a backward motion vector from a frame of the received signal other than the current frame.

4. A transcoder as in claim 1 in which the estimated motion vectors generated by the motion vector processor include:
   at least one motion vector for previous-frame prediction which is a scaled version of the motion vector from a frame of the received signal which involved prediction from a non-consecutive earlier frame.

5. A transcoder as in claim 1 in which the motion vector processor produces an estimated motion vector which is the difference between backward motion vectors from two frames of the received signal.

6. A transcoder as in claim 1 in which the motion vector processor generates one or more of a plurality of possible estimated motion vectors in accordance with a predetermined hierarchy.

7. A transcoder as in claim 1 in which the motion vector processor generates a plurality of candidate estimated motion vectors and motion estimation evaluates the candidate estimated motion vectors and selects one in accordance with a predetermined criterion.

8. A transcoder as in claim 1 wherein the two coding schemes employ different orders of transmission of the frames of the video signal and the transcoder further includes re-ordering means for re-ordering the received signal.

9. A transcoder comprising:
   a decoder for decoding a received video signal coded according to a first coding scheme employing motion-compensated inter-frame predictive coding in which frames are coded out of sequence such that the coding of some frames involves prediction from a later frame using backward motion vectors,
   an encoder for reencoding the signal according to a second coding scheme in which at least some frames are coded using motion-compensated inter-frame predictive coding based on a reference frame which is not the same in the second coding scheme as it is in the first coding scheme, characterised in that the transcoder includes
   a motion vector processor generating an estimated motion vector for a current frame of the video signal, the motion vector processor being connected to receive, when processing vectors for a current frame, vectors which, in the received signal, accompany at least one other frame of the video signal, and being operable to reverse the sign of backward motion vectors when generating estimated motion vector for use by the encoder when re-encoding using forward prediction, and
   means operable to carry out motion estimation within a search area centered on a position determined by the estimated motion vector.

10. A transcoder as in claim 9 wherein:
    the signals represent a video image divided into blocks of picture elements, and motion estimation is carried out on a block-by-block basis.

11. A transcoder as in claim 9 including a buffer buffering received motion vectors and a delay delaying the video signals prior to reencoding.

12. A transcoder as in claim 9 in which the motion vector processor produces an estimated motion vector which is the reverse of a backward motion vector from a frame of the received signal other than the current frame.

13. A transcoder as in claim 9 in which the estimated motion vectors generated by the motion vector processor include:
    at least one motion vector for previous-frame prediction which is a scaled version of the motion vector from a frame of the received signal which involved prediction from a non-consecutive earlier frame.

14. A transcoder as in claim 9 in which the motion vector processor produces an estimated motion vector which is the difference between backward motion vectors from two frames of the received signal.

15. A transcoder as in claim 9 in which the motion vector processor generates one or more of a plurality of possible estimated motion vectors in accordance with a predetermined hierarchy.

16. A transcoder as in claim 9 in which the motion vector processor generates a plurality of candidate estimated motion vectors and motion estimation evaluates the candidate estimated motion vectors and selects one in accordance with a predetermined criterion.

17. A transcoder as in claim 9 wherein the two coding schemes employ different orders of transmission of the frames of the video signal and the transcoder further includes re-ordering means for re-ordering the received signal.

18. A method of transcoding a received video signal coded according to a first coding scheme employing motion-compensated inter-frame predictive coding in which frames are coded out of sequence such that the coding of some frames involves prediction from a later frame using backward motion vectors into a signal according to a second coding scheme in which at least some frames are coded using motion-compensated inter-frame predictive coding based on a reference frame which is not the same in the second coding scheme as it is in the first coding scheme, said method comprising:

processing received motion vectors to generate an estimated motion vector for a current frame of the video signal, the processing step being responsive, when processing vectors for a current frame, to vectors which, in the received signal, accompany at least one other frame of the video signal, and reversing the sign of backward motion vectors when generating estimated motion vectors for use in recoding using forward prediction.

19. A method of transcoding as in claim 18 wherein the signals represent a video image divided into blocks of picture elements, and the motion estimation is carried out on a block-by-block basis.

20. A method as in claim 18, including buffering the received motion vectors and delaying the video signals prior to reencoding.

21. A method as in claim 18 in which the motion vector processing includes generating an estimated motion vector which is the reverse of the motion vector from a frame of the received signal other than the current frame.

22. A method as in claim 18 in which the estimated motion vectors generated by the motion vector processing include at least one motion vector for previous-frame prediction which is a scaled version of the motion vector from a frame of the received signal which involved prediction from a non-consecutive earlier frame.

23. A method as in claim 18 in which the motion vector processing includes generating an estimated motion vector which is the difference between backward motion vectors from two frames of the received signal.

24. A method as in claim 18 in which the motion vector processing generates one of more of a plurality of possible estimated motion vectors in accordance with a predetermined hierarchy.

25. A method as in claim 18 in which the motion vector processing generates a plurality of candidate estimated motion vectors and motion estimation is used to evaluate the candidate estimated motion vectors and to select one in accordance with a predetermined criterion.

26. A method as in claim 18 wherein the two coding schemes employ different orders of transmission of the frames of the video signal and the decoded received sign al is re-ordered.

27. A method of transcoding a received video signal coded according to a first coding scheme employing motion-compensated inter-frame predictive coding in which frames are coded out of sequence such that the coding of some frames involves prediction from a later frame using backward motion vectors into a signal according to a second coding scheme in which at least some frames are coded using motion-compensated inter-frame predictive coding based on a reference frame which is not the same in the second coding scheme as it is in the first coding scheme, said method comprising:

processing received motion vectors to generate an estimated motion vector for a current frame of the video signal, the processing step being responsive, when processing vectors for a current frame, to vectors which, in the received signal, accompany at least one other frame of the video signal, and reversing the sign of backward motion vectors when generating estimated motion vectors for use in recoding using forward prediction and by including the step of carrying out motion estimation within a search area centered on a position determined by the estimated motion vector.

28. A method of transcoding as in claim 27 wherein the signals represent a video image divided into blocks of picture elements, and the motion estimation is carried out on a block-by-bock basis.

29. A method as in claim 27 including buffering the received motion vectors and delaying the video signals prior to reencoding.

30. A method as in claim 27 in which the motion vector processing includes generating an estimated motion vector which is the reverse of the motion vector from a frame of the received signal other than the current frame.

31. A method as in claim 27 in which the estimated motion vectors generated by the motion vector processing include at least one motion vector for previous-frame prediction which is a scaled version of the motion vector from a frame of the received signal which involved prediction from a non-consecutive earlier frame.

32. A method as in claim 27 in which the motion vector processing includes generating an estimated motion vector which is the difference between backward motion vectors from two frames of the received signal.

33. A method as in claim 27 in which the motion vector processing generates one of more of a plurality of possible estimated motion vectors in accordance with a predetermined hierarchy.

34. A method as in claim 27 in which the motion vector processing generates a plurality of candidate estimated motion vectors and motion estimation is used to evaluate the candidate estimated motion vectors and to select one in accordance with a predetermined criterion.

35. A method as in claim 27 wherein the two coding schemes employ different orders of transmission of the frames of the video signal and the decoded received signal is re-ordered.

* * * * *